United States Patent
Sato et al.

(10) Patent No.: US 7,255,933 B2
(45) Date of Patent: Aug. 14, 2007

(54) MULTI-LAYER SLIDING PART AND A METHOD FOR ITS MANUFACTURE

(75) Inventors: Issaku Sato, Tokyo (JP); Kenzo Tadokoro, Mouka (JP); Hideaki Tanibata, Mouka (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 10/919,525

(22) Filed: Aug. 17, 2004

(65) Prior Publication Data

US 2005/0069448 A1 Mar. 31, 2005

Related U.S. Application Data

(63) Continuation-in-part of application No. 10/644,965, filed on Aug. 21, 2003.

(30) Foreign Application Priority Data

Aug. 23, 2002 (JP) .............................. 2002-242759
Aug. 18, 2003 (JP) .............................. 2003-294031

(51) Int. Cl.
- B22F 15/01 (2006.01)
- B22F 15/20 (2006.01)
- B22F 7/04 (2006.01)
- B22F 3/16 (2006.01)
- C22C 9/02 (2006.01)

(52) U.S. Cl. ................. 428/674; 428/648; 428/565; 428/570; 428/677; 384/13; 384/463; 384/910; 419/8; 419/10; 419/23; 419/29; 419/31; 419/33; 419/38

(58) Field of Classification Search ................. 428/548, 428/565, 566, 570, 613, 677; 384/910, 13, 384/463; 419/10, 28, 29, 30, 64, 23, 31, 419/33, 38
See application file for complete search history.

(56) References Cited

U.S. PATENT DOCUMENTS

| | | | | |
|---|---|---|---|---|
| 4,233,254 A | * | 11/1980 | Sato et al. | 264/37.29 |
| 4,243,728 A | * | 1/1981 | Sato et al. | 428/570 |
| 4,582,368 A | * | 4/1986 | Fujita et al. | 384/13 |
| 4,917,509 A | | 4/1990 | Takano | 384/275 |

(Continued)

FOREIGN PATENT DOCUMENTS

| | | | |
|---|---|---|---|
| JP | 55-134103 | * | 10/1980 |
| JP | 55134102 | | 10/1980 |

(Continued)

OTHER PUBLICATIONS

Kanezaki et al, 05-209207 english abstract, Title—Bearing, Publisher—Japanese Patent Abstracts.*

(Continued)

*Primary Examiner*—Jennifer McNeil
*Assistant Examiner*—Jason L. Savage
(74) *Attorney, Agent, or Firm*—Michael Tobias

(57) ABSTRACT

A multi-layer sliding part is prepared by a process including mixing 1–50 parts by volume of a Cu-plated solid lubricant powder with 100 parts by volume of a Cu-based alloy powder comprising 5–20 mass % of Sn and a remainder of Cu to form a mixed powder, sintering the mixed powder in a reducing atmosphere to form a sintered mass, pulverizing the sintered mass to form a powder, dispersing the powder formed by pulverizing on a metal backing plate, and sintering the dispersed powder to bond grains of the dispersed powder to each other and to the backing plate. After sintering of the pulverized powder to form bearing metal layer, the bearing metal layer is pressed and densified. After densification, the bearing metal layer is annealed, again pressed, and then coated with a resin having good sliding properties.

20 Claims, 2 Drawing Sheets

U.S. PATENT DOCUMENTS

| | | | |
|---|---|---|---|
| 5,298,336 A | 3/1994 | Tanaka et al. | 428/552 |
| 6,132,487 A * | 10/2000 | Mori | 75/247 |
| 6,492,033 B2 | 12/2002 | Sato et al. | 428/553 |
| 6,601,992 B2 | 8/2003 | Tabuti et al. | 384/420 |
| 6,613,453 B2 | 9/2003 | Sato et al. | 428/676 |
| 2003/0000376 A1* | 1/2003 | Sugiura et al. | |
| 2004/0091732 A1* | 5/2004 | Sato et al. | |

FOREIGN PATENT DOCUMENTS

| | | | |
|---|---|---|---|
| JP | 55164050 | | 12/1980 |
| JP | 59-080521 | * | 5/1984 |
| JP | 63-282221 | * | 11/1988 |
| JP | 63282221 | | 11/1988 |
| JP | 05-209207 | * | 8/1993 |
| JP | 05248441 | | 9/1993 |
| JP | 11013638 | | 1/1999 |
| JP | 11131107 | | 5/1999 |
| JP | 2003021056 | | 1/2003 |

OTHER PUBLICATIONS

Katmitsuma et al. 63-282221 english abstract, Title— Manufacture of Composite Sintered Material, Publisher— Japanese Patent Abstracts.*

NDC KK, 59-080521 english abstract, Title—Lubricated bearing material production, Publisher—Japanese Patent Abstracts.*

Kato et al, 55-134103 english abstract, Title—Copper Alloy Blank for Bearing, Publisher—Japanese Patent Abstracts.*

* cited by examiner

MULTI-LAYER SLIDING PART AND A METHOD FOR ITS MANUFACTURE

REFERENCE TO RELATED APPLICATIONS

This application is a continuation-in-part of patent application Ser. No. 10/644,965 filed on Aug. 21, 2003 and entitled "Multi-layer Sliding Part and a Method for its Manufacture".

BACKGROUND OF THE INVENTION

1. Field of the Invention

This invention relates to a lead-free multi-layer sliding part and to a method for its manufacture. Examples of a sliding part according to the present invention are a cylindrical sliding part such as a bushing for use in a radial sliding bearing (also called a journal bearing) and a planar sliding part for use as a swash plate in a compressor, pump, or hydraulic motor.

2. Description of the Related Art

Sliding bearings are often made of a multi-layer sliding material comprising a backing plate of steel and a layer of a bearing metal bonded to the backing plate in order to increase the strength of the bearings so that they can withstand high loads.

Methods for joining a bearing metal layer to a steel backing plate include the cladding method, the casting method, the flame coating method, and the powder metallurgy method.

In the cladding method, the bonding strength between the bearing metal and the steel backing plate is relatively low, so when a high load is applied to a sliding bearing made from such a multi-layer material, there are cases in which the bearing metal layer peels off the steel backing plate.

In the casting method, a molten bearing metal is cast atop a steel backing plate. Although a bearing metal layer formed by the casting method has a strong bonding strength to the steel backing plate, this method is very troublesome to perform, and at the time of casting of the molten bearing metal, oxides can be included or shrinkage cavities can form, and these may have an adverse effect on bearing properties.

In the flame coating method, a molten bearing metal is blown against a steel backing plate by a high pressure gas, and due to its kinetic energy, the bearing metal burrows into the steel backing plate to form a bearing metal layer. The bearing metal forms a mechanical bond with the backing plate rather than a metallurgical bond, so the bonding strength between the bearing metal layer and the backing plate may be inadequate, and there are cases in which the bearing metal layer peels off the backing plate during use.

In the powder metallurgy method, a bearing metal in the form of a powder is dispersed on a steel backing plate and is sintered to join the grains of powder to each other and to the backing plate. A multi-layer material which is obtained by the powder metallurgy method has a strong bonding strength between the sintered bearing metal layer and the steel backing plate, and the sintering temperature can be made low, so there are few thermal effects on the steel backing plate or the bearing metal such as can occur with the casting method.

The materials which have been most commonly used to form a bearing metal layer of a multi-layer sliding bearing have been Cu-based alloys such as lead bronze, phosphor bronze, and high strength brass.

Lead bronze has good bearing properties, but it is a potential source of environmental pollution. When equipment containing a multi-layer bearing is discarded, the bearing is usually disposed of by burial underground, since the bearing metal layer and the steel backing plate cannot be readily separated from each other and so cannot be easily recycled. If a multi-layer bearing containing lead bronze which has been disposed of in a landfill is contacted by acid rain, lead may be dissolved from the bearing metal layer by the acid rain and may pollute underground water. If underground water which has been polluted by lead in this manner enters the water supply and is drunk for long periods by humans or livestock, the lead accumulates in the body and may cause lead poisoning. For this reason, the disposal of lead-containing materials is being increasingly regulated, and there is a trend in industry away from the use of lead-containing materials such as lead bronze for bearing metal layers of sliding bearings.

Phosphor bronze and high strength brass do not contain lead, but their sliding or bearing properties may not be adequate when they are subjected to high instantaneous loads, such as are applied to a swash plate of a compressor or hydraulic motor at the start of operation. As a result, these materials are more susceptible to seizing.

When a sliding part made of a multi-layer sliding material having a bearing metal layer bonded to a steel backing plate is manufactured by the powder metallurgy method, it is thought to be possible to improve the sliding properties of the bearing metal layer by incorporating a solid lubricant into the bearing metal layer. For this purpose, a powder of a bearing metal is mixed with a powder of a solid lubricant, such as graphite or molybdenum disulfide ($MoS_2$), and the mixed powder is used to form the bearing metal layer by sintering.

However, such a sliding part having a sintered bearing metal layer containing a solid lubricant has the problem that the bearing metal layer may be cracked by an impact when subjected to a high load, thereby causing the bearing metal layer to peel off partly or completely or to wear out prematurely, leading to the occurrence of seizing.

JP-A 55-134102 (1980) describes forming a bearing by sintering of a mixture of metal powders and a Cu-plated solid lubricant powder. According to the technique disclosed therein, metal powders (such as Cu powder and Sn powder) which form a bearing metal are mixed with a Cu-plated solid lubricant powder (such as Cu-plated graphite powder or Cu-plated molybdenum disulfide powder). The powder mixture is subjected to cold or hot pressing in a mold and then sintered to form a Cu-based sintered bearing. The sintered body may be machined so as to form a bore and obtain a cylindrical bearing. However, this sintered bearing exhibits large variations in bearing properties, and if it is used as a bearing metal layer of a multi-layer bearing, its mechanical strength is too low for it to be used as a bushing for construction equipment on which a very high load is exerted. The use of Cu-plated graphite to form a sintered bearing material is also described in JP-A 05-248441 (1993).

The present inventors investigated the problems of conventional multi-layer sliding parts, such as sliding bearings, in order to provide a lead-free multi-layer sliding part in which these problems are eliminated or alleviated, and found the following.

The reason for the seizing which is encountered with a bearing made of phosphor bronze and high strength brass is that these bearing metals do not have good lubricity in the absence of a solid lubricant.

A bearing metal layer containing a solid lubricant formed by sintering a powder mixture of a bearing metal and a solid lubricant on a steel backing plate has improved lubricity, but it undergoes cracking and peeling because the particles of solid lubricant do not metallically bond to either the bearing metal or to the steel backing plate, so the bearing metal layer formed by sintering has poor bonding strength.

This problem can be alleviated to some extent by employing the technique disclosed in JP-A 55-134102 (1980), i.e., by plating the solid lubricant powder with copper and using the resulting Cu-plated solid lubricant powder to form a lubricant-containing bearing metal layer by sintering, since the Cu-plated solid lubricant powder can metallically bond to the bearing metal. However, according to the technique disclosed therein, various powders including a Cu powder, a Sn powder, and a Cu-plated solid lubricant powder are used to form a powder mixture to be sintered, and due to the differences in specific gravity of these powders, it is difficult to form a uniform mixture by mechanical mixing, and this results in a fluctuation in the bearing properties of the resulting sintered bearing layer. In addition, the mechanical strength of the sintered bearing metal layer is not sufficient to withstand a very high load. There is no bonding between the steel backing plate and the sintered bearing metal layer.

SUMMARY OF THE INVENTION

The present invention overcomes the above-described problems of conventional multi-layer sliding parts and provides a lead-free multi-layer sliding part having a bearing metal layer with a highly uniform structure and a strong bonding strength to a steel backing plate. In spite of not containing lead, the sliding part has excellent bearing properties comparable to or superior to those of conventional sliding parts employing lead bronze as a bearing metal. The multi-layer sliding part has a bearing metal layer which is strongly bonded to a backing plate and which does not undergo cracking or peeling when subjected to a high load. The multi-layer sliding part is thus suitable for uses involving the application of high loads and/or high operational speeds.

According to one form of the present invention, a multi-layer sliding part comprises a metal backing plate such as a steel plate and a bearing metal layer bonded to the backing plate. The bearing metal layer is formed by a method including sintering a mixture of 1–50 parts by volume of a Cu-plated solid lubricant powder with 100 parts by volume of a Cu-based alloy powder comprising 5–20 mass % of Sn and a remainder of Cu. In the sintered bearing metal layer, the Cu-plated solid lubricant powder and the Cu-based alloy powder are metallically bonded to each other, and these powders are secured to the metal backing plate by sintering. The multi-layer sliding part may further include a coating of a resin having good sliding properties formed atop the bearing metal layer.

According to another form of the present invention, a method of manufacturing a multi-layer sliding part comprises (a) mixing 1–50 parts by volume of a Cu-plated solid lubricant powder with 100 parts by volume of a Cu-based alloy powder comprising 5–20 mass % of Sn and a remainder of Cu to form a mixed powder, (b) sintering the mixed powder in a reducing atmosphere at 750–850° C. to form a sintered mass, (c) pulverizing the sintered mass to form a powder with a particle size of at most 300 μm, (d) dispersing the powder formed by pulverizing on a backing plate, (e) sintering the dispersed powder in a reducing atmosphere at 800–880° C. to bond grains of the dispersed powder to each other and to the backing plate to form a bearing metal layer on the backing plate, thereby forming a multi-layer material, (f) pressing the multi-layer material to densify the bearing metal layer, (g) annealing the multi-layer material after pressing in a reducing atmosphere at 840–880° C., and (h) pressing the annealed multi-layer material to increase the strength and hardness of the multi-layer material. The method may further include (i) coating the bearing metal layer with a resin having good sliding properties.

The density of the bearing metal layer is preferably at least 85% to prevent the formation of depressions in the bearing metal layer where it is in sliding contact with another member during use.

A multi-layer sliding part according to the present invention is not restricted to any particular form. For example, it can be in the form of a cylindrical sliding part such as a bushing for use in a radial sliding bearing (a journal bearing) or a planar sliding part for use as a swash plate in a compressor, pump, or hydraulic motor.

DESCRIPTION OF PREFERRED EMBODIMENTS

Figure 1:
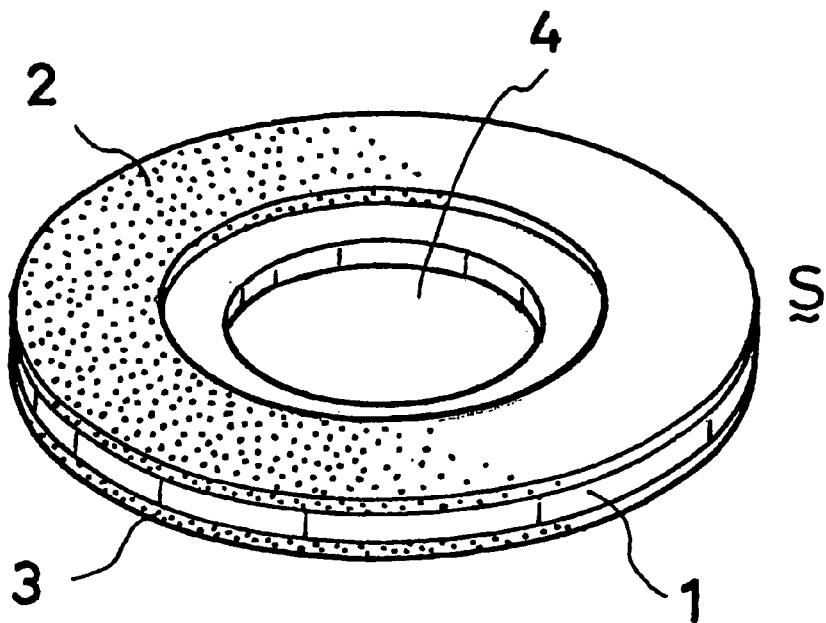
FIG. 1 is an axonometric view of an embodiment of a multi-layer sliding part according to the present invention in the form of a swash plate.

A multi-layer sliding part according to the present invention includes a bearing metal layer and a metal backing plate bonded to the bearing metal layer. Typically, the backing plate is a steel plate.

The bearing metal layer is prepared by a method including mixing a Cu-plated solid lubricant powder with a powder of a Cu-based alloy comprising 5–20 mass % of Sn and a remainder of Cu followed by sintering the mixture. The Cu-based alloy may contain a minor amount of one or more additional alloying elements, and it is preferably a lead-free Cu-based alloy.

In contrast to the disclosure in JP-A 55-134102 (1980) in which a Cu powder and a Sn powder are mixed with a Cu-plated solid lubricant powder, a powder of a Cu—Sn alloy which has previously been prepared is mixed with a Cu-plated solid lubricant powder, and the resulting powder mixture is sintered on a metal backing plate, thereby forming a bearing metal layer which is bonded to the metal backing plate by sintering.

If the content of Sn in the Cu—Sn alloy is less than 5 mass %, a bearing metal layer having a sufficient hardness is not obtained, while if the Sn content exceeds 20 mass %, the bearing metal layer becomes brittle.

The solid lubricant used in the Cu-plated solid lubricant powder is preferably selected from graphite, molybdenum disulfide, tungsten disulfide, and mixtures of two or more of these. The plating of a solid lubricant powder with Cu may be performed by any convenient plating method, such as electroless plating or displacement plating (immersion plating).

The amount of the Cu-plated solid lubricant powder is preferably 1–50 parts by volume with respect to 100 parts by volume of the Cu—Sn alloy powder. If the amount of the solid lubricant powder is less than 1 part by volume, the resulting bearing metal layer does not have sufficient frictional properties, and seizing quickly occurs, while if the amount exceeds 50 parts by volume, the resulting bearing metal layer does not have sufficient mechanical strength.

The mixing of the Cu-based alloy powder with the solid lubricant powder is preferably carried out in a reducing atmosphere to reduce oxidation of the powders and to remove oxide layers from the powders so that the particles of the powder can be more effectively sintered to each other. Some examples of a suitable reducing atmosphere are an atmosphere of hydrogen gas or ammonia decomposition gas (75% hydrogen, 25% nitrogen).

After the Cu-plated solid lubricant powder and the Cu—Sn alloy powder are thoroughly mixed with each other, initial sintering of the powders is performed, preferably at 750–850° C., to form a sintered mass. The sintering is preferably performed in a reducing atmosphere, such as that described above. If the sintering temperature is lower than 750° C., the bonding strength between powder grains is not sufficient. On the other hand, if the sintering temperature is higher than 850° C., the Cu which plates the solid lubricant diffuses into the Cu—Sn alloy powder and disappears from the surface, so the Cu—Sn alloy powder and the solid lubricant can no longer be bonded to each other, and they end up separating.

The sintered mass formed by sintering the Cu-plated solid lubricant powder and the Cu—Sn alloy powder is then pulverized by any convenient pulverizing apparatus, such as a mill, to form a powder. The Cu-plated solid lubricant and the Sn—Cu alloy powder have different specific gravities, and if they were simply mixed by a mixing machine, the Cu-plated solid lubricant would not be uniformly mixed with the Cu—Sn alloy powder. However, if the Cu-plated solid lubricant powder and Sn—Cu alloy powder are sintered to form a sintered mass and then pulverized, the solid lubricant is uniformly distributed throughout the pulverized powder. The particle size of the pulverized powder is preferably 300 μm or less. If the particle size of the pulverized powder is larger than 300 μm, the resulting bearing metal layer will have numerous voids, and the ability of the bearing metal layer to journal a shaft will be poor. More preferably, the particle diameter of the pulverized powder is approximately 100 μm.

The pulverized powder is then dispersed on a metal backing plate, such as a steel plate, and then sintered, preferably in a reducing atmosphere such as that described above, preferably at 800–880° C., in order to bond the grains of the powder to each other and to the backing plate. If the sintering temperature at this time is less than 800° C., the bonding strength of the grains of the alloy powder to each other and to the backing plate is not sufficient, while if the sintering temperature exceeds 880° C., iron in the steel backing plate and Cu in the powder form an intermetallic compound which decreases the bonding strength of the bearing metal layer to the backing plate.

The multi-layer material obtained by sintering the pulverized powder to the backing plate is then subjected to initial pressing to densify the bearing metal layer. In an as-sintered state, the bearing metal layer is porous with a density of at most 80%, so if the bearing metal layer is used in a bearing in this state, the porous portions of the bearing metal layer can be crushed when the bearing metal layer is pressed by a sliding member. As a result, ruts can form in the bearing metal layer. If the bearing metal layer is densified by initial pressing to obtain an alloy density of at least 85%, the porous portions in the bearing metal layer can be crushed, and ruts or other depressions will not form in the bearing metal layer when the multi-layer material is used as a bearing. A pressing load of 150–250 tons is generally suitable for the initial pressing. Pressing may be performed using any convenient pressing device, such as a press or rollers.

After initial pressing, the multi-layer material is annealed in a reducing atmosphere preferably at 840–880° C. The annealing reduces the hardness of the steel backing plate and the bearing metal layer(s) of the multi-layer material, which may have been excessively work hardened by the initial pressing, to a suitable level, and peeled portions formed during initial pressing are resintered to increase the bonding strength. Adequate annealing does not take place if the annealing temperature is less than 840° C., while if the annealing temperature is higher than 880° C., the hardness of the steel plate decreases too much, and the mechanical strength of the multi-layer material ends up decreasing.

After annealing, the multi-layer material is subjected to pressing a second time using any convenient pressing device, such as a press or rollers. The second pressing operation increases the hardness, which may have decreased too much during annealing, to a prescribed level and increases the mechanical strength. In addition, it reduces the thickness of the bearing metal layer to close to a desired thickness and makes it easier to perform subsequent mechanical working steps to form a multi-layer bearing. A hardness of Hv 100–140 for the bearing metal layer after the second pressing step is suitable. If a desired thickness can be obtained by the second pressing step, it is possible to proceed directly to the next step. However, when it is difficult to obtain a desired thickness in the second pressing step, the thickness in the second pressing step may be left at slightly larger than the desired thickness, and machining may be subsequently performed with a lathe to adjust the thickness.

If the sintered bearing metal layer is formed on both sides of the metal backing plate, as is sometimes the case with a planar bearing for a swash plate, all of the above-described steps, from the dispersion of the pulverized powder through the second pressing, may first be performed on one side of the metal backing plate, and then they may be all repeated on the other side of the backing plate. However, preferably, after the dispersion of the pulverized powder and the subsequent sintering are finished on one side of the backing plate, the same procedures are repeated on the other side thereof, and the subsequent steps of initial pressing, annealing, and second pressing are then performed on both sides simultaneously.

After the second pressing operation, the multi-layer material can be subjected to various working operations, such as polishing, machining, punching, bending, and joining, depending upon the intended use of the multi-layer material as a sliding part. For example, when the multi-layer material is to be formed into a journal bearing or bushing, after the second pressing operation, the multi-layer material is typically punched to form a generally rectangular blank of a suitable size. The blank is then bent into a cylindrical shape, with the bearing metal layer on the interior of the cylinder, and opposing ends of the blank are joined to each other by a suitable method, such as by forming a clinch-butt joint. Examples of procedures for forming a multi-layer material into a journal bearing are described in U.S. Pat. No. 6,613,453, which is incorporated by reference. Examples of procedures for forming a multi-layer material into a swash plate are described in U.S. Pat. No. 6,492,033, which is also incorporated by reference.

FIG. 1 is an axonometric view of an embodiment of a multi-layer sliding part according to the present invention in the form of a swash plate S for an automotive air conditioner. The swash plate S includes bearing metal layers 2 and 3 formed on opposite sides of a disc-shaped steel backing plate 1. A hole 4 into which a rotating shaft can inserted is formed at the center of the swash plate S. The backing plate 1 may also include a plurality of unillustrated mounting holes surrounding the central hole 4 through which bolts or other fastening members can be passed to secure the backing plate 1 to a shaft or other member. As described below, a resin coating may be formed atop one or both of the bearing metal layers 2 and 3, but since the resin coating is typically much thinner than the bearing metal layers, it is not visible in the figure.

Figure 2:
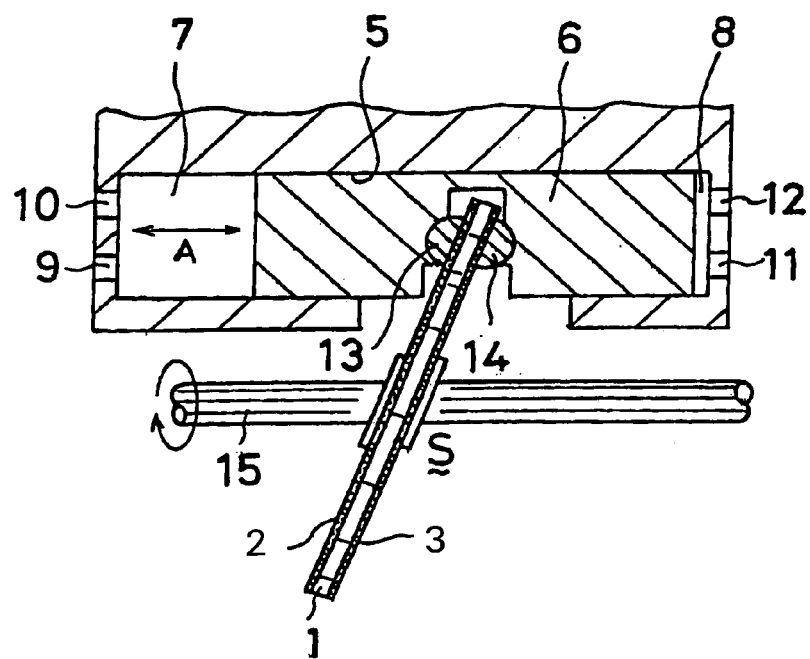
FIG. 2 is a cross-sectional view of a portion of a compressor for an automotive air conditioner employing a swash plate according to the present invention.

FIG. 2 is a cross-sectional view of a portion of a typical swash plate compressor for an automotive air conditioner employing the swash plate S of FIG. 1. The compressor includes a piston 6 slidably disposed for reciprocating movement inside a cylinder 5. The cylinder 5 is divided by the piston 6 into a left cylinder chamber 7 and a right cylinder chamber 8. A left intake valve 9 and a left discharge valve 10 communicate with the left cylinder chamber 7, and a right intake valve 11 and a right discharge valve 12 communicate with the right cylinder chamber 8. At the center of the piston 6, the swash plate S is sandwiched between a left shoe 13 and a right shoe 14, with bearing metal layer 2 (or a resin coating, if present) in sliding contact with the left shoe 13 and bearing metal layer 3 (or a resin coating, if present) in sliding contact with the right shoe 14. The swash plate S is mounted on a rotating shaft 15 nonperpendicularly with respect to the axis of the shaft 15.

When the shaft 15 is rotated during the operation of the compressor, because the swash plate S is installed nonperpendicularly on the rotating shaft 15, the rotation of the swash plate S causes the piston 6 to reciprocate as shown by arrow A to perform a pumping action in a well-known manner.

The sliding properties of a multi-layer sliding part according to the present invention can be further improved, especially in the initial stage of operation of the sliding part, by coating the bearing metal layer(s) of the sliding part with a resin having good sliding properties. Some examples of suitable resins with good sliding properties for forming such a resin coating are polyamide, polyimide, polyamide imide, and polytetrafluoroethylene (PTFE). A single such resin can be employed, or a plurality of such resins can be used in combination.

To yet further improve sliding properties, the resin coating may further include one or more solid lubricant such as graphite powder, molybdenum disulfide, or polytetrafluoroethylene. The use of a plurality of types of such solid lubricants in the resin coating generally improves sliding properties more than does use of a single type of solid lubricant. The amount of a solid lubricant in the resin coating can vary depending upon the intended use of the multi-layer sliding part, but an example of a suitable range for the total amount of solid lubricants in a resin coating of a swash plate according to the present invention for a compressor of an automotive air conditioner such as that shown in FIG. 2 is 5–80 volume % of the resin coating. Some examples of suitable amounts of specific solid lubricants in the resin coating, whether present individually or in combination with other solid lubricants, are 5–10 volume % of the resin coating for $MoS_2$, 30–70 volume % of the resin coating for graphite, and 20–65 volume % of the resin coating for PTFE.

The resin coating is typically formed atop the bearing metal layer(s) after the completion of all metalworking and heat treatment operations of the bearing metal layer(s). A typical method of forming a resin coating on a bearing metal layer is to apply a dispersion containing the resin and solid lubricant, if present, to the bearing metal layer and then baking the dispersion in a heating furnace. The thickness of the resin coating is not restricted but is typically at least 5 μm. An example of a preferred range for the thickness is 13–17 μm.

The adhesion between the bearing metal layer and the resin coating can be increased by roughening the surface of the bearing metal layer to impart small surface irregularities prior to forming the resin coating. If the surface of the bearing metal layer is roughened prior to forming the coating, the surface area of the bearing metal layer increases, and the resin having good sliding properties becomes engaged with the roughened bearing metal surface and produces stronger adhesion by an anchoring effect. An example of a method of roughening the surface of the bearing metal is machining of the surface with a lathe. If the bearing metal layer is machined with a lathe, the lathe will form surface marks resembling the grooves in a phonograph record. Examples of other suitable methods of roughening the surface of the bearing metal layer are sandblasting and etching.

EXAMPLES

The present invention will be further described by the following examples.

Examples 1–3 and Comparative Examples 1–3

The bearing metal powders and Cu-plated solid lubricant powders having the compositions shown in the following Table 1 were used to prepare a multi-layer sliding part in the form of a swash plate for a compressor for an automotive air conditioner.

TABLE 1

| | Composition (mass %) | | | | | | | | Cu—Sn (parts by volume) | Cu-plated graphite (parts by volume) | Cu-plated $MoS_2$ (parts by volume) | Remarks |
| --- | --- | --- | --- | --- | --- | --- | --- | --- | --- | --- | --- | --- |
| | Cu | Sn | Pb | P | Zn | Fe | Al | Mn | | | | |
| Example 1 | rem | 10 | | | | | | | rem | 7 | | This invention |
| Example 2 | rem | 10 | | | | | | | rem | | 11 | This invention |

TABLE 1-continued

| | Composition (mass %) | | | | | | | Cu—Sn (parts by volume) | Cu-plated graphite (parts by volume) | Cu-plated MoS$_2$ (parts by volume) | Remarks |
|---|---|---|---|---|---|---|---|---|---|---|---|
| | Cu | Sn | Pb | P | Zn | Fe | Al | Mn | | | | |
| Example 3 | rem | 10 | | | | | | | rem | 7 | 7 | This invention |
| Comparative Example 1 | rem | 10 | 10 | | | | | | | | | Lead bronze |
| Comparative Example 2 | rem | 10 | | 0.1 | | | | | | | | Phosphor bronze |
| Comparative Example 3 | rem | | | | 25 | 3 | 4 | 3 | | | | High strength brass |

Each swash plate included a backing plate in the form of a steel disk, and a bearing metal layer was formed on both sides of the disk. The swash plate was prepared by the following steps (a)–(h). Steps (d) and (e) were first performed on one side of the disk, and then they were repeated on the opposite side of the disk. Steps (f)–(h) were performed on both sides of the disk at the same time.

(a) Mixing: For each example of the present invention, one or more Cu-plated solid lubricant powders in an amount shown in Table 1 was mixed with 100 parts by volume of a Cu-based bearing metal powder having the composition shown in the table for that example.

(b) Initial sintering: The mixed powder obtained in step (a) was sintered by heating at 800° C. in a hydrogen-containing reducing atmosphere to form a sintered mass.

(c) Pulverizing: The sintered mass formed in step (b) was pulverized with a hammer mill to form a powder with a particle size of at most 200 μm.

(d) Dispersion: The pulverized powder from step (c) was uniformly dispersed to a thickness of 0.8 mm on a steel disk having a thickness of 5.0 mm and a diameter of 80 mm.

(e) Sintering: The steel plate on which the pulverized powder was dispersed was heated in the same reducing atmosphere as above at 860° C. to bond the powder grains to each other and to the steel disk and obtain a multi-layer material comprising a bearing metal layer and the steel disk.

(f) First pressing: The multi-layer material was pressed with a load of 200 tons by a press to densify the bearing metal layer.

(g) Annealing: The densified bearing metal layer was heated for 15 minutes at 860° C. in a hydrogen atmosphere in a heating furnace.

(h) Second pressing: The annealed multi-layer material was pressed with a load of 180 tons by a press to obtain a swash plate having a prescribed mechanical strength. The swash plate was then finished by machining with a precision lathe.

Figure 3:
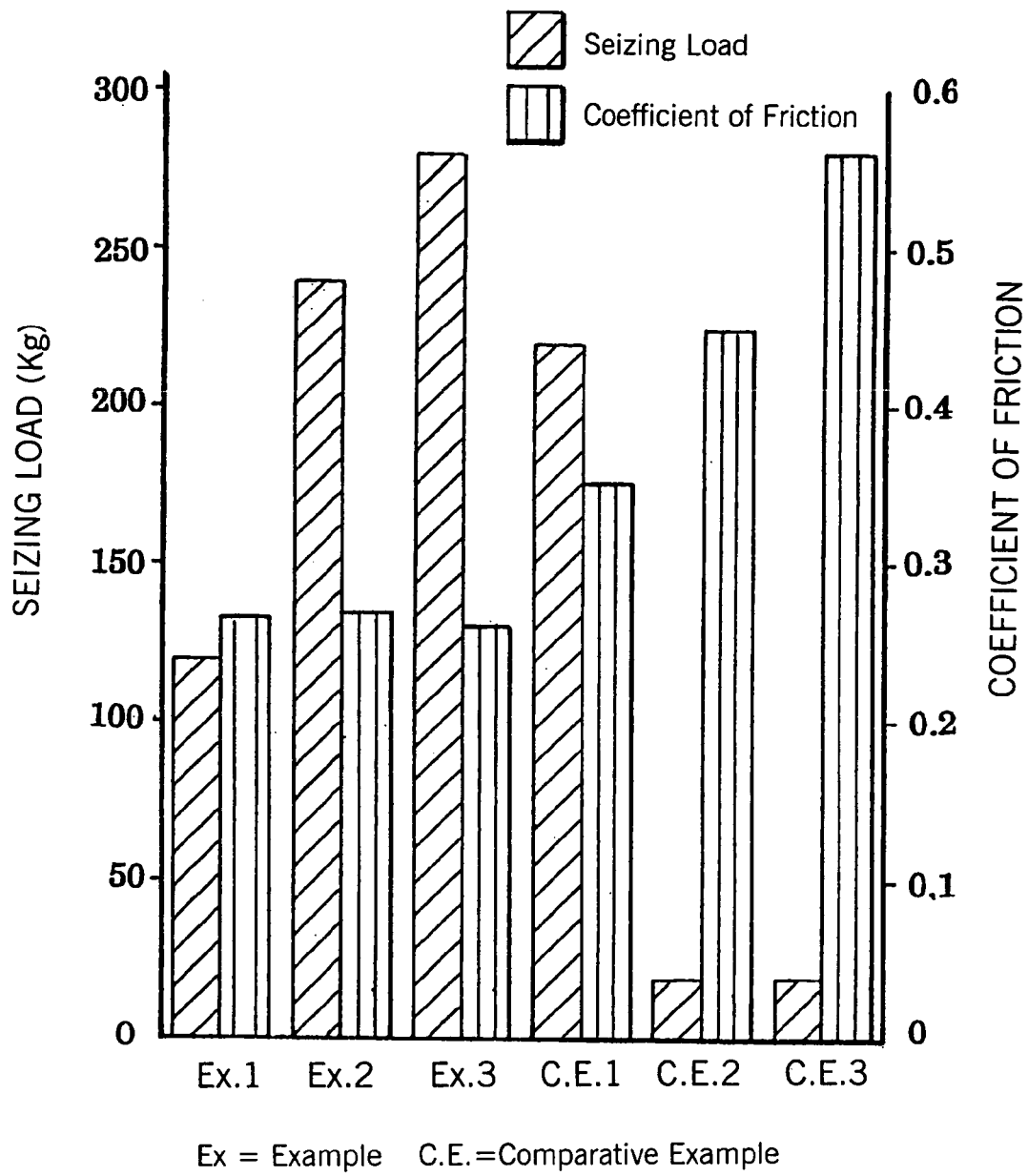
FIG. 3 is a graph showing bearing properties of examples of a multi-layer sliding part according to the present invention and comparative examples of a multi-layer sliding part.

The seizing load (the load at which seizing occurred) and the coefficient of friction of the swash plates formed in this manner using the compositions shown in the table are illustrated in FIG. 3. The seizing load of the swash plates was measured using a friction tester with the swash plate in a dry state. The coefficient of friction of the swash plates was measured using a thrust tester at a circumferential speed of 2.31 m/sec. As can be seen from FIG. 3, the multi-layer swash plates according to the examples of this invention had superior bearing properties compared to the comparative examples, which corresponded to conventional multi-layer swash plates.

Examples 4–5, Comparative Examples 4–6

Example 4 of a swash plate according to the present invention having a resin coating on both of its surfaces was prepared by the following steps (a)–(i). As in the preceding examples, steps (d) and (e) were first performed on one side of a steel disk, and then they were repeated on the opposite side of the disk prior to proceeding to step (f). Steps (f)–(i) were performed on both sides of the disk at the same time.

(a) Mixing: 4 parts by volume of Cu-plated graphite powder were mixed with 100 parts by volume of brass alloy powder made from 10 mass percent of Sn and a remainder of Cu.

(b) Initial sintering: The mixed powder obtained in step (a) was heated at 800° C. in a reducing atmosphere to form a sintered mass.

(c) Pulverizing: The sintered mass formed in step (b) was pulverized in a hammer mill to form a powder with a particle size of approximately 100 micrometers.

(d) Dispersion: The pulverized powder obtained in step (c) was uniformly dispersed to a thickness of 0.8 mm on one side of a steel backing plate (S45C) having a thickness of 5.0 mm and a diameter of 80 mm.

(e) Sintering: The steel backing plate on which the pulverized powder was dispersed was heated in a heating furnace containing a reducing atmosphere at 860° C. to sinter the powder particles to each other and to the steel backing plate to form a multi-layer member.

(f) First pressing: The multi-layer member obtained in step (e) was pressed with a load of 200 tons to densify the bearing metal layers.

(g) Annealing: The densified bearing metal layers were heated for 15 minutes in a heating furnace containing a reducing atmosphere at 860° C. to perform annealing.

(h) Second pressing: The annealed bearing metal layers were pressed in a press with a load of 180 tons. After pressing, the hardness of the bearing metal layers was Hv 100. Machining was performed with a precision lathe to give the bearing metal layers a uniform thickness and to give the surface of the bearing metal layers a suitable roughness.

(i) Resin coating: A dispersion comprising polyamide imide, which is a resin having good sliding properties, and solid lubricants in the form of PTFE, MoS$_2$, and graphite was applied to the surface of both of the bearing metal layers, and then baking was carried out in a heating furnace at 180° C. to cure the resin.

Example 5 of a swash plate was prepared in the same manner as was Example 4 except that step (i) of forming a resin coating on the bearing metal layers was omitted.

Comparative Examples 4–6 were examples of conventional swash plates. Comparative Example 4 of a swash plate did not include a solid lubricant in its bearing metal layer, the bearing metal layer was not subjected to densification by pressing, and a resin coating was not formed atop the bearing metal layer.

Comparative Example 5 of a swash plate did not include a solid lubricant in its bearing metal layer, and a resin coating was not formed atop the bearing metal layer, but the bearing metal layer was subjected to densification by pressing.

Comparative Example 6 of a swash plate did not include a solid lubricant in its bearing metal layer, and the bearing metal layer was not subjected to densification by pressing, but it did have a resin coating formed atop the bearing metal layer.

The coefficient of friction and durability of each of these examples and comparative examples were tested in the following manner.

Coefficient of friction: Each swash plate was mounted horizontally on the base of a thrust testing machine with one of the surfaces of the swash plate facing upwards. The testing machine had a horizontal rotating disk facing the top surface of the swash plate. Three shoes for use in a swash plate compressor like the shoes 13 and 14 shown in FIG. 2 were secured to the lower side of the disk opposing the top surface of the swash plate, each shoe at a radial distance of 34.5 mm from the center of the disk. The disk was rotated about its axis at 4000 rpm, and an axial force was applied to the disk to press the shoes against the top surface of the swash plate with a total force normal to the top surface of the swash plate of 20 kg for the 3 shoes. The torque required to rotate the disk at 4000 rpm with the shoes pressed against the swash plate was measured and was used to calculate the coefficient of friction of the top surface of the swash plate by the following formula:

$$\text{coefficient of friction} = \text{torque required to rotate disk} / [\text{force pressing shoes against swash plate} \times \text{moment arm of force } (= \text{distance of shoes from center of disk})]$$

$$= \text{torque}/(20 \text{ kg} \times 34.5 \text{ mm})$$

Durability: During the measurement of the coefficient of friction, with the disk rotating at 4,000 rpm and the shoes contacting the top surface of the swash plate, the temperature of the swash plate was measured, and the number of minutes (rounded down to the nearest whole number) until the temperature of the swash plate reached 200° C. was measured. A value of 0 minutes means that the temperature of the swash plate reached 200° C. before the elapse of 1 minute.

The manufacturing methods used for these examples and comparative examples and the results of the tests are summarized in the following table.

TABLE 2

| Example No. | Bearing metal layer contains solid lubricant? | Densification of bearing metal layer? | Resin coating on bearing metal layer? | Coefficient of friction | Durability (minutes to reach 200° C.) |
| --- | --- | --- | --- | --- | --- |
| Example 4 | Yes | Yes | Yes | 0.137 | 26 |
| Example 5 | Yes | Yes | No | 0.193 | 8 |
| Comp. Ex. 4 | No | No | No | 0.295 | 0 |
| Comp. Ex. 5 | No | Yes | No | 0.216 | 5 |
| Comp. Ex. 6 | No | No | Yes | 0.143 | 1 |

From a comparison of the results for Comparative Examples 4 and 6, it can be seen that although the provision of a resin coating on a conventional bearing metal layer of a swash plate significantly decreases the initial coefficient of friction of the swash plate, it produces only a minor increase in the durability (from 0 minutes to 1 minute) because the resin coating soon wears off, and the underlying bearing metal layer does not have good sliding properties.

In contrast, from a comparison of Examples 4 and 5 of the present invention, it can be seen that the provision of a resin coating on the bearing metal layer of a swash plate according to the present invention provides not only a significant decrease in the initial coefficient of friction, but also an enormous increase in durability (from 8 minutes to 26 minutes). Thus, the combination of a bearing metal layer according to the present invention and a resin coating provides a synergistic effect which cannot be predicted from the prior art.

A multi-layer sliding part according to the present invention has superior bearing properties compared to a conventional Cu-based multi-layer sliding part, and it has a sufficient mechanical strength to withstand a high load. Accordingly, the bearing properties of the sliding part can be stably maintained for long periods even when the sliding part is used as a sliding bearing for compressors or hydraulic equipment, or when it is used as a bushing for supporting rollers on the undercarriage of construction equipment, to which an extremely high load is applied. When the sliding part includes a resin coating, the sliding properties of the sliding part are further improved, not only at the start of operation but over an extended period.

What is claimed is:

1. A multi-layer sliding part prepared by a method comprising mixing 1-50 parts by volume of a Cu-plated solid lubricant powder with 100 parts by volume of an alloy powder consisting of 5-20 mass % of Sn and a remainder of Cu to form a mixed powder, sintering the mixed powder to form a sintered mass, pulverizing the sintered mass to form a powder, dispersing the powder formed by pulverizing on a metal backing plate, sintering the dispersed powder to bond grains of the dispersed powder to each other and to the backing plate to form a bearing metal layer, densifying the bearing metal layer, and coating the surface of the bearing metal layer with a resin having good sliding properties to form a resin coating.

2. A multi-layer sliding part as claimed in claim 1 wherein the solid lubricant of the Cu-plated solid lubricant powder is selected from graphite, molybdenum disulfide, tungsten disulfide, and mixtures of these.

3. A multi-layer sliding part as claimed in claim 1 wherein the resin having good sliding properties comprises at least one material selected from a polyamide resin, a polyimide resin, a polyamide imide resin, and polytetrafluoroethylene.

4. A multi-layer sliding part as claimed in claim 1 wherein the resin coating contains at least one material selected from graphite powder, molybdenum disulfide, and polytetrafluorethylene as a solid lubricant.

5. A multi-layer sliding part as claimed in claim 4 wherein the resin coating contains a plurality of different types of solid lubricants.

6. A swash plate compressor comprising a cylinder, a piston slidably disposed in the cylinder, a rotatable shaft, and a multi-layer sliding part as claimed in claim 1 mounted on the shaft for rotation with the shaft and operatively engaging the piston such that rotation of the shaft causes the piston to reciprocate in the cylinder.

7. A method of manufacturing a multi-layer sliding part comprising:
  (a) mixing 1-50 parts by volume of a Cu-plated solid lubricant powder with 100 parts by volume of a Cu-based alloy powder comprising 5-20 mass % of Sn and a remainder of Cu to form a mixed powder,
  (b) sintering the mixed powder to form a sintered mass,
  (c) pulverizing the sintered mass to form a powder,
  (d) dispersing the powder formed by pulverizing on a backing plate,
  (e) sintering the dispersed powder to bond grains of the dispersed powder to each other and to the backing plate to form a bearing metal layer on the backing plate, thereby forming a multi-layer material,
  (f) pressing the multi-layer material to densify the bearing metal layer,
  (g) annealing the multi-layer material after pressing,
  (h) pressing the annealed multi-layer material to increase the strength of the multi-layer material, and
  (i) coating the bearing metal layer with a resin having good sliding properties.

8. A method as claimed in claim 7 wherein the solid lubricant of the Cu-plated solid lubricant powder is selected from graphite, molybdenum disulfide, tungsten disulfide, and mixtures of these.

9. A method as claimed in claim 7 including coating the bearing metal layer with a dispersion containing the resin having good sliding properties and a solid lubricant.

10. A method as claimed in claim 7 wherein the sintering in step (b) is carried out at a temperature of 750-850° C.

11. A method as claimed in claim 7 wherein the sintering in step (e) is carried out at a temperature of 800-880° C.

12. A method as claimed in claim 7 wherein the sintering in steps (b) and (e) is carried out in a reducing atmosphere.

13. A method as claimed in claim 7 wherein the annealing in step (g) is carried out at a temperature of 840-880° C.

14. A method as claimed in claim 7 including pulverizing the sintered mass in step (c) to form a powder with a particle size of at most 300 µm.

15. A method of manufacturing a multi-layer sliding part comprising:
  (a) mixing 1-50 parts by volume of a Cu-plated solid lubricant powder with 100 parts by volume of a Cu-based alloy powder comprising 5-20 mass % of Sn and a remainder of Cu to form a mixed powder,
  (b) sintering the mixed powder to form a sintered mass,
  (c) pulverizing the sintered mass to form a powder,
  (d) dispersing the powder formed by pulverizing on a backing plate,
  (e) sintering the dispersed powder to bond grains of the dispersed powder to each other and to the backing plate to form a bearing metal layer on the backing plate, thereby forming a multi-layer material,
  (f) pressing the multi-layer material to densify the bearing metal layer, and
  (g) coating the bearing metal layer with a resin having good sliding properties.

16. A method as claimed in claim 7 wherein the density of the bearing metal layer after densifying in step (f) is at least 85%.

17. A method as claimed in claim 7 wherein the bearing metal layer has a hardness of Hv 100-140 at the completion of step (h).

18. A method as claimed in claim 7 wherein the Cu-based alloy powder consists of Cu and Sn.

19. A method as claimed in claim 7 wherein step (g) comprises coating the bearing metal layer to form a resin coating containing a solid lubricant.

20. A method as claimed in claim 19 wherein the resin coating contains a plurality of different types of solid lubricants.

* * * * *